US012761387B2

(12) United States Patent
ElOuair et al.

(10) Patent No.: US 12,761,387 B2
(45) Date of Patent: Oct. 13, 2026

(54) GEOSTATISTICAL DEPTH MAP BASED HYDROCARBON EXPLORATION

(71) Applicant: Saudi Arabian Oil Company, Dhahran (SA)

(72) Inventors: Youness ElOuair, Dhahran (SA); Ivan A. Salazar Buendia, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 407 days.

(21) Appl. No.: 18/503,528

(22) Filed: Nov. 7, 2023

(65) Prior Publication Data

US 2025/0147197 A1 May 8, 2025

(51) Int. Cl.
*G01V 1/50* (2006.01)
*E21B 49/00* (2006.01)

(52) U.S. Cl.
CPC ................ *G01V 1/50* (2013.01); *E21B 49/00* (2013.01); *E21B 2200/20* (2020.05); *G01V 2210/622* (2013.01); *G01V 2210/63* (2013.01)

(58) Field of Classification Search
CPC ... G01V 1/50; G01V 1/48; G01V 1/44; G01V 1/40; G01V 1/00; G01V 2210/622; G01V 2210/62; G01V 2210/60; G01V 2210/00; G01V 2210/63; E21B 49/00; E21B 2200/20; E21B 2200/00
See application file for complete search history.

(56) References Cited

U.S. PATENT DOCUMENTS

| | | | | |
|---|---|---|---|---|
| 2009/0164186 A1* | 6/2009 | Haase | G01V 99/00 | 703/2 |
| 2010/0074053 A1* | 3/2010 | Jaiswal | G01V 1/301 | 367/73 |
| 2013/0054212 A1* | 2/2013 | Buland | G01V 1/303 | 703/6 |
| 2013/0289962 A1* | 10/2013 | Wendt | G01V 1/306 | 703/10 |
| 2015/0109885 A1* | 4/2015 | Nowak | G01V 1/40 | 367/25 |

(Continued)

OTHER PUBLICATIONS

Abrahamsen "Bayesian Kriging for Seismic Depth Conversion of a Multi-Layer Reservoir," Geostatistics Tróia '92, 1993, 5:385-398, 14 pages.

(Continued)

*Primary Examiner* — Mohamed Charioui
(74) *Attorney, Agent, or Firm* — Fish & Richardson P.C.

(57) ABSTRACT

Example computer-implemented methods and systems for geostatistical depth map based hydrocarbon exploration are disclosed. One example computer-implemented method includes obtaining one or more seismic attributes at multiple wellbores of a hydrocarbon reservoir. Multiple prior velocity maps of the hydrocarbon reservoir are determined based on the obtained one or more seismic attributes. Multiple velocities are determined based on the multiple prior velocity maps. Multiple depth map realizations are determined based on the multiple velocities. Multiple gross volumetric uncertainties of the hydrocarbon reservoir are determined based on the multiple depth map realizations. The multiple gross volumetric uncertainties are provided for hydrocarbon exploration of the hydrocarbon reservoir.

20 Claims, 16 Drawing Sheets

(56) References Cited

U.S. PATENT DOCUMENTS

| | | | | |
|---|---|---|---|---|
| 2021/0405234 | A1* | 12/2021 | Gunderson | G01V 1/303 |
| 2022/0073809 | A1* | 3/2022 | Alkhalaf | G01V 99/00 |
| 2023/0243991 | A1* | 8/2023 | Salem | G01V 1/303<br>702/16 |

OTHER PUBLICATIONS

Bartel, et al., "Time to Depth Conversion and Uncertainty Assessment Using Average Velocity Modeling," SEG New Orleans 2006 Meeting, Jan. 2006, 5 pages.

Batzle et al., "Seismic properties of pore fluids," Geophysics, 57(11), Nov. 1992, 1396-1408, 13 pages.

Cressie "Statistics for Spatial Data," Wiley, 1993, 908 pages.

Deutsch et al., "GSLIB: Geostatistical software library and user's guide," Oxford University Press, Second Edition, 375 pages.

Dix, "Seismic velocities from surface measurement," Geophysics, Jan. 1955, 20(1), 68-86, 19 pages.

Geostatistics: An Overview, Oliver (ed)., Geostatistical Applications for Precision Agriculture, Springer, 2010, 337 pages.

geovariances.com (online), "Uncertainty Quantification for Static Reservoir Models," 2024, retrieved on Apr. 15, 2024, retrieved from URL<https://www.geovariances.com/en/uncertainty-quantification-for-static-reservoir-models/>, 4 pages.

* cited by examiner

*Crossplot between Depth Well markers (Z) and extracted Two-way-Time horizons (TWT) at exact well locations*

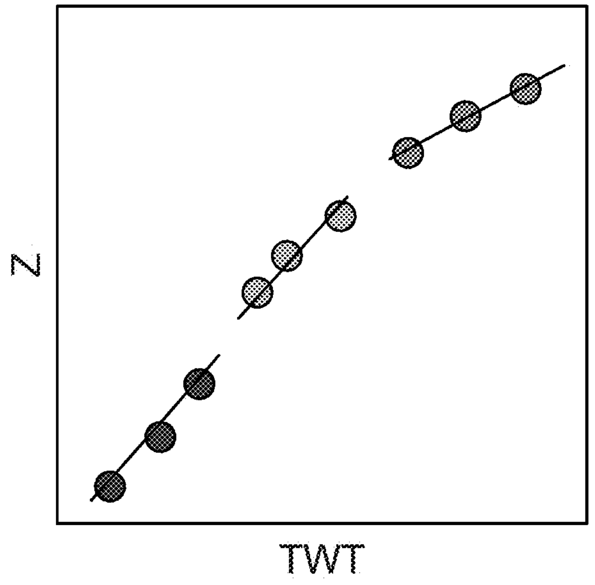

$Z_{prior\#1} = \alpha_1 Twt_1 + \beta_1$ $>> V_{int_{prior\#1}} = \frac{1}{2} (Z_{prior\#1} - Z_0)/(Twt_1 - Twt_0)$ $Z_{prior\#2} = \alpha_2 Twt_2 + \beta_2$ $>> V_{int_{prior\#2}} = \frac{1}{2} (Z_{prior\#2} - Z_{prior\#1})/(Twt_2 - Twt_1)$ $Z_{prior\#3} = \alpha_3 Twt_3 + \beta_3$ $>> V_{int_{prior\#3}} = \frac{1}{2} (Z_{prior\#3} - Z_{prior\#2})/(Twt_3 - Twt_2)$ with $Z_0$=SRD (Seismic Reference Datum) and $Twt_0$=0ms

FIG. 2B

GEOSTATISTICAL DEPTH MAP BASED HYDROCARBON EXPLORATION

TECHNICAL FIELD

The present disclosure relates to computer-implemented methods and systems for geostatistical depth map based hydrocarbon exploration.

BACKGROUND

Time-to-depth conversion is an integral part of a seismic interpretation workflow. As seismic data is measured in a two-way-time domain (TWT), a velocity model calibrated to well data (e.g., geological markers) can be used to convert seismic interpretation (e.g., horizons, faults, or seismic volumes) into a depth domain. Although actual velocities can be retrieved at well locations, for example, using check-shots or logs, interpolating or extrapolating the actual velocities at locations away from wells can be challenging.

SUMMARY

The present disclosure involves computer-implemented methods and systems for geostatistical depth map based hydrocarbon exploration. One example computer-implemented method includes obtaining one or more seismic attributes at multiple wellbores of a hydrocarbon reservoir. Multiple prior velocity maps of the hydrocarbon reservoir are determined based on the obtained one or more seismic attributes. Multiple velocities are determined based on the multiple prior velocity maps. Multiple depth map realizations are determined based on the multiple velocities. Multiple gross volumetric uncertainties of the hydrocarbon reservoir are determined based on the multiple depth map realizations. The multiple gross volumetric uncertainties are provided for hydrocarbon exploration of the hydrocarbon reservoir.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the hydrocarbon exploration of the hydrocarbon reservoir includes at least one of reservoir development, field appraisal, or well placement in the hydrocarbon reservoir.

In some implementations, the multiple gross volumetric uncertainties of the hydrocarbon reservoir includes at least one of uncertainties in gross rock volume estimates of the hydrocarbon reservoir or a likelihood of a top of the hydrocarbon reservoir being above a given fluid contact at each grid cell position in the multiple depth map realizations.

In some implementations, determining the multiple velocities involves determining, based on the multiple prior velocity maps, multiple variogram estimates; and determining, based on the multiple variogram estimates, the multiple velocities.

In some implementations, the one or more seismic attributes include multiple seismic stacking velocities of the hydrocarbon reservoir, and determining the multiple prior velocity maps of the hydrocarbon reservoir involves determining, based on the multiple seismic stacking velocities, the multiple prior velocity maps.

In some implementations, multiple interpreted seismic two-way time horizons of the hydrocarbon reservoir are obtained; and determining the multiple prior velocity maps involves determining, based on the multiple interpreted seismic two-way time horizons and the obtained one or more seismic attributes, the multiple prior velocity maps.

In some implementations, multiple depth geological markers at the multiple wellbores of the hydrocarbon reservoir are obtained; and determining the multiple prior velocity maps involves determining, based on the multiple depth geological markers and the obtained one or more seismic attributes, the multiple prior velocity maps.

In some implementations, obtaining the multiple depth geological markers involves obtaining the multiple depth geological markers based on check-shots at the multiple wellbores of the hydrocarbon reservoir.

In some implementations, determining the multiple velocities involves determining the multiple velocities based on a Sequential Gaussian Simulation (SGS) method.

In some implementations, the prior velocity maps includes one of prior interval velocity maps or prior average velocity maps.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIGS. 2A and 2B illustrate an example of determining a two-dimensional (2D) prior interval velocity map using a correlation between well depth markers and two-way-time travel time horizons, according to some implementations.

Like reference numbers and designations in the various drawings indicate like elements.

DETAILED DESCRIPTION

This disclosure describes systems and methods for geostatistical depth map based hydrocarbon exploration. To determine velocities at locations away from wells and consequently depth information of a hydrocarbon reservoir, a computer system can use a geostatistical simulation method to generate multiple equiprobable depth maps. The depth maps are based on existing well geological markers (e.g., hard data) and prior trend velocity models derived from multiple seismic attributes, for example, two-way time or stacking velocities, through a Sequential Gaussian Simulation (SGS) method. The computer system can summarize the generated depth map realizations as standard statistical maps, for example, P10, P50, and P90 percentiles maps or standard deviation maps. The computer system can then determine volumetric probability distributions, such as, bulk rock volume or a probability of a portion of the hydrocarbon reservoir to be above a given hydrocarbon fluid contact. The determined volumetric probability distributions can be used in hydrocarbon exploration, for example, in assessing the risks or opportunities associated with reservoir development or in determining field appraisal, well placement, or production strategies. For example, the volumetric probability distributions can be used for selecting well locations for field operations 1310 in FIG. 13. In some cases, uncertainties in reservoir parameters can be considered in the process of identifying well locations that maximize recovery potential and minimize risks. Then, the drilling tools can be controlled to drill in the identified well locations. Additionally, the volumetric probability distributions can be used to estimate the range of hydrocarbon resources within a reservoir. By incorporating uncertainties in reservoir parameters, a range of potential outcomes can be evaluated, which is important for risk assessment and resource planning.

The disclosed systems and methods provide multiple advantages over existing systems. As an example, the velocity field interpolation and/or extrapolation can be better constrained using input seismic attributes. As another example, the full posterior distribution of the actual depth can be estimated at any point in the 3D space of a hydrocarbon reservoir, even away from wells in the hydrocarbon reservoir.

Figure 1A:
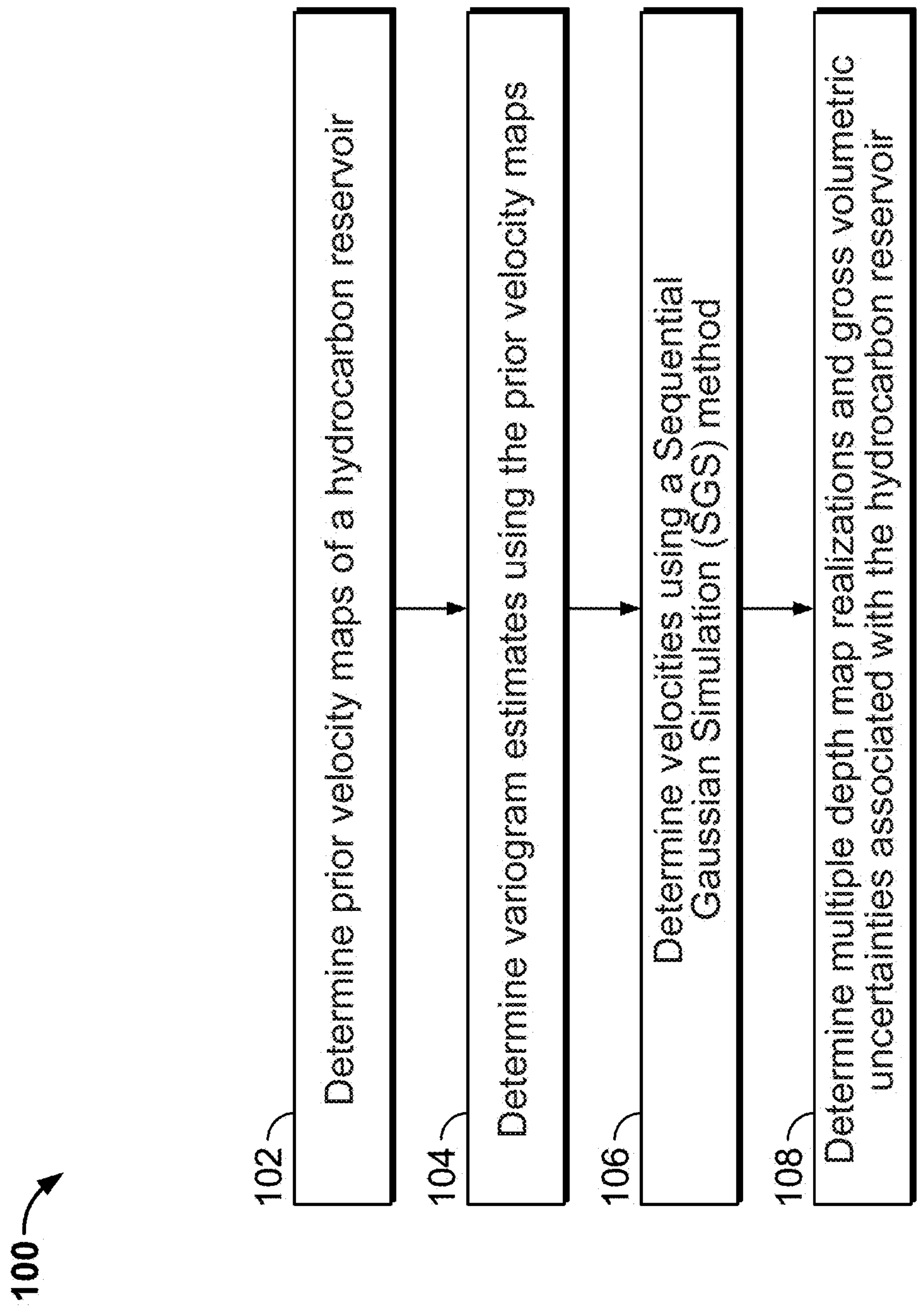
FIG. 1A illustrates an example process of geostatistical depth conversion and probabilistic evaluation of volumetric quantities associated with a hydrocarbon reservoir, according to some implementations.

FIG. 1A illustrates an example process 100 of geostatistical depth conversion and probabilistic evaluation of volumetric quantities associated with a hydrocarbon reservoir. For convenience, process 100 will be described as being performed by a system of one or more computers, located in one or more locations, and programmed appropriately in accordance with this specification.

Figure 1B:
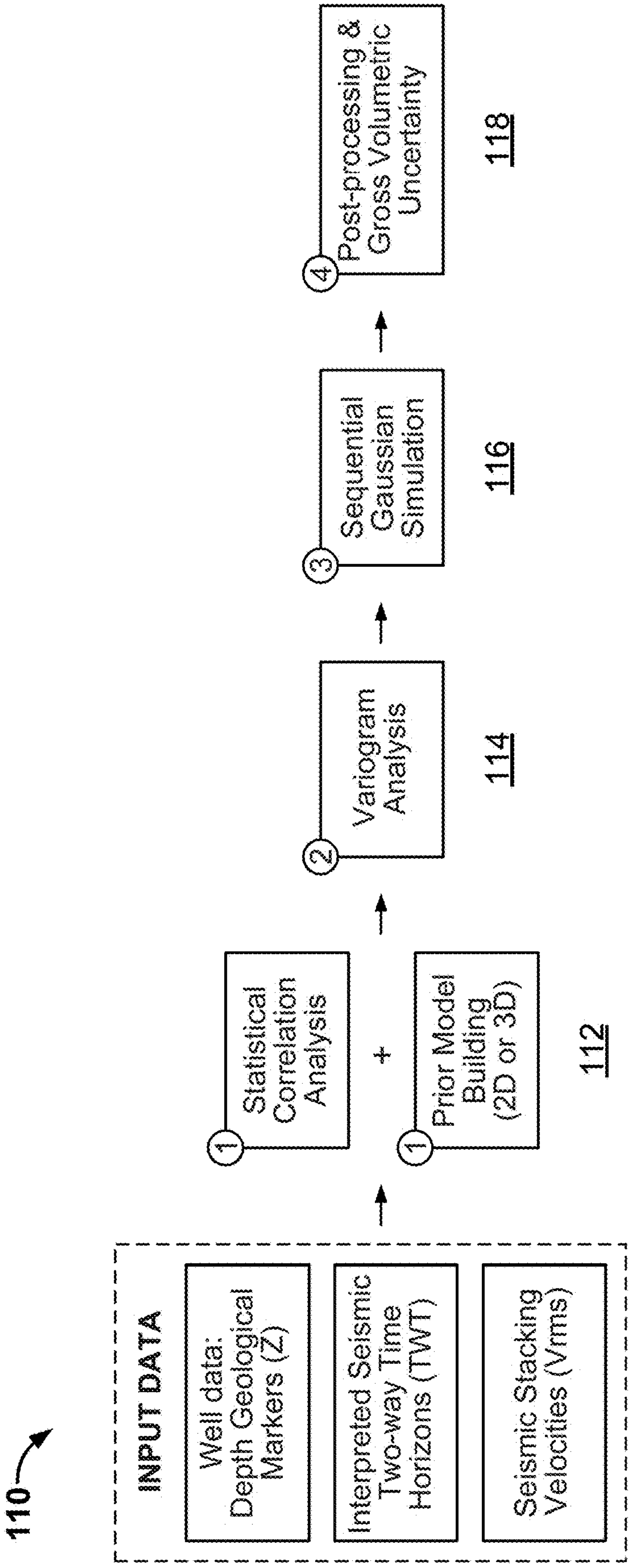
FIG. 1B illustrates a workflow that corresponds to the example process of FIG. 1A, according to some implementations.

FIG. 1B illustrates a workflow 110 that corresponds to the example process 100 of FIG. 1A, according to some implementations. For example, 112 in FIG. 1B corresponds to 102 in FIG. 1A and uses input data such as depth geological markers (Z), interpreted seismic two-way time horizons (TWT), and seismic stacking velocities (Vrms) from a hydrocarbon reservoir for statistical correlation analysis and prior model (2D or 3D) building. 114 in FIG. 1B corresponds to 104 in FIG. 1A and performs variogram analysis on the output data from 112. 116 in FIG. 1B corresponds to 106 in FIG. 1A and applies a Sequential Gaussian Simulation to the output data from 114. 118 in FIG. 1B corresponds to 108 in FIG. 1A and performs post-processing of the output data from 116 and determines gross volumetric uncertainty associated with the hydrocarbon reservoir.

Returning to FIG. 1A, at 102, a computer system determines prior velocity maps of a hydrocarbon reservoir. The prior velocity maps can be two-dimensional (2D) and/or three-dimensional (3D) velocity maps.

In some implementations, the computer system can determine a set of two-dimensional (2D) prior interval velocity models. The 2D prior interval velocity models can describe a correlated relationship between the actual velocities (or depths) at multiple well locations in the hydrocarbon reservoir and seismic attributes at the same well locations. The seismic derived prior interval velocity models can be used later in process 100 as a secondary trend variable (e.g., external drift) to determine velocities or depths at locations away from the existing wells in the hydrocarbon reservoir. In some cases, a correlation analysis can be carried out to determine a set of seismic attributes that give the highest correlation with the actual velocities (or depths) among various seismic attributes. If the highest correlation is lower than a threshold, for example, 0.5, the computer system may determine to not proceed with the remaining steps in FIG. 1A.

In some examples, a strong correlation (e.g., greater than a threshold) between well depth markers (Z) and two-way-time travel time horizons (TWT) can be established. In these examples, the computer system can determine the set of 2D prior interval velocity models in two steps. In a first step, the computer system can fit a linear regression between the depth geological markers (Z) at the multiple well locations and the corresponding picked two-way-time values (Twt) extracted at the multiple well locations. Then, the computer system can determine a depth prior map ($Z_{prior_k}$) for each picked horizon (i.e., interface) as a function of picked horizon time ($Twt_k$) using Equation 1 below, with k being the interface number, and $\alpha_k$ and $\beta_k$ being the coefficients from the linear regression:

$$Z_{prior_k} = \alpha_k Twt_k + \beta_k \quad (1)$$

In a second step, once the computer system determines the depth prior map for each interface, the computer system can determine the prior interval velocity map between two successive interfaces using Equation 2 below:

$$V_{int_{prior_k}} = \frac{1}{2}\left[Z_{prior_k} - Z_{prior_{(k-1)}}\right]/\left[Twt_k - Twt_{(k-1)}\right] \tag{2}$$

Figure 2A:
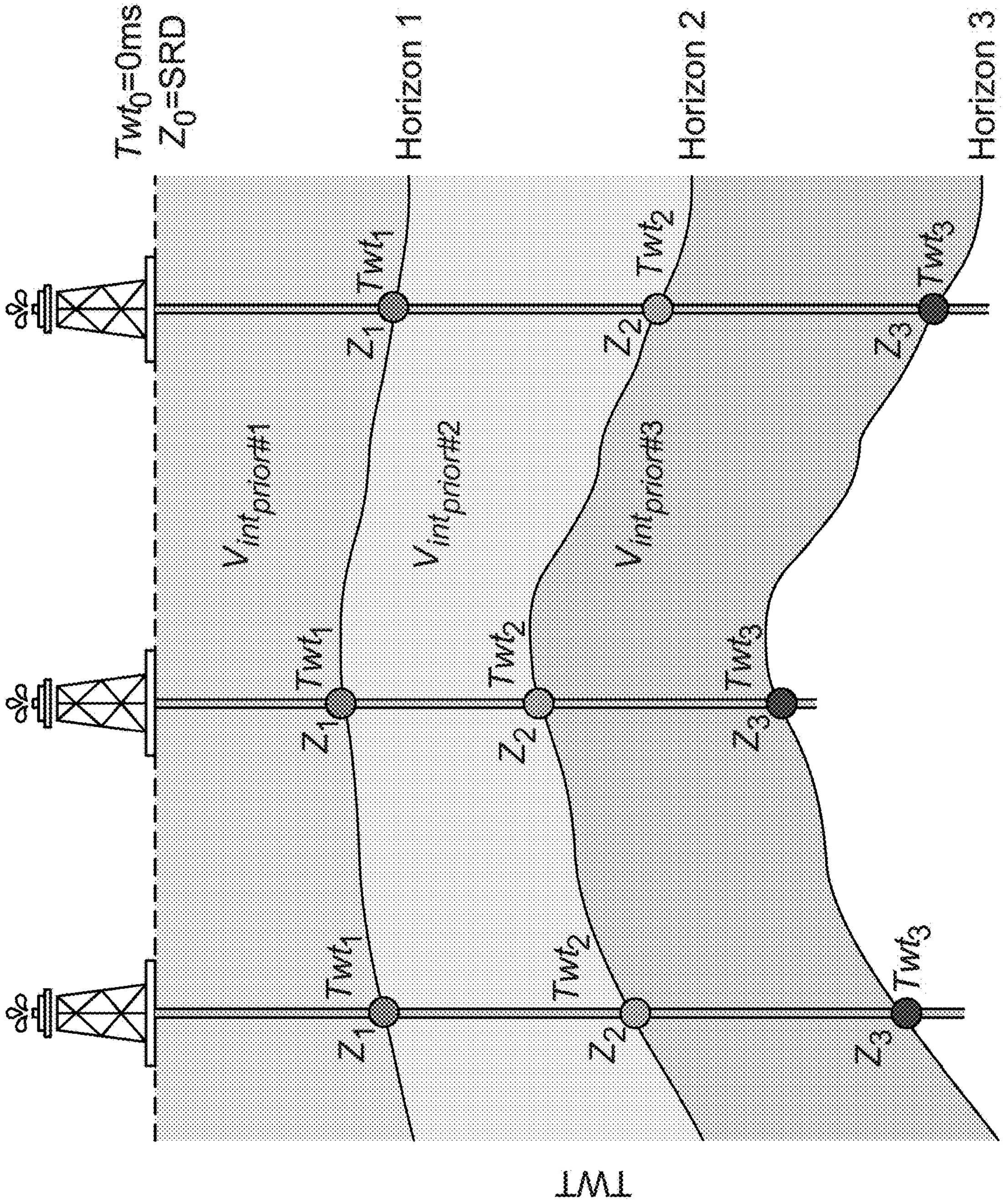

FIGS. 2A and 2B illustrate an example of determining a 2D prior interval velocity map using a correlation between well depth markers (Z) and two-way-time travel time horizons (Twt). As shown in FIGS. 2A and 2B, a computer system can determine a depth prior map ($Z_{prior_k}$) for each of three picked horizons (interfaces), i.e., horizon 1, horizon 2, and horizon 3, as a function of picked horizon time ($Twt_k$) at three well locations, using Equation 1. Then the computer system can determine the prior interval velocity map ($V_{int_{priork}}$) between every two successive interfaces, i.e., between the surface and horizon 1, between horizon 1 and horizon 2, and between horizon 2 and horizon 3, using Equation 2.

In some implementations, the computer system can determine a correlation between actual well average velocity ($V_{avg}$) and derived seismic average velocity ($V_{seis}$). In some cases, the computer system can determine the seismic average velocity using Dix conversion of seismic stacking velocities $V_{rms}$.

In some implementations, the computer system can determine the prior interval velocity between two interfaces (picked horizons) in two steps. In a first step, for a given interface, the computer system can fit a linear regression between actual well average velocity ($V_{avg}$) and the corresponding seismic average velocity ($V_{seis}$) values extracted at the exact well locations. Then the computer system can determine an average velocity prior map for each interface k as a function of seismic average velocity using Equation 3 below, with k being the interface number, and $\alpha_k$ and $\beta_k$ being the coefficients from the linear regression:

$$V_{avg_{prior_k}} = \alpha_k V_{seis_k} + \beta_k \tag{3}$$

In a second step, once the average velocity prior map is estimated for each interface, the computer system can determine the prior interval velocity map between two successive interfaces using Equation 4 below:

$$V_{int_{prior_k}} = \frac{1}{4}\left[V_{avg_{prior_k}} Twt_k - V_{avg_{prior_{(k-1)}}} Twt_{(k-1)}\right]/\left[Twt_k - Twt_{(k-1)}\right] \tag{4}$$

In some cases, the zero interface (k=0) corresponds to the zero Twt value ($Twt_0$=0 ms) with a depth refence value equal to Surface Reference Datum (SRD). The SRD can either be the Mean-Sea-Level zero (e.g., in an offshore seismic scenario) or a floating datum (e.g., in an onshore seismic scenario).

Figure 3A:
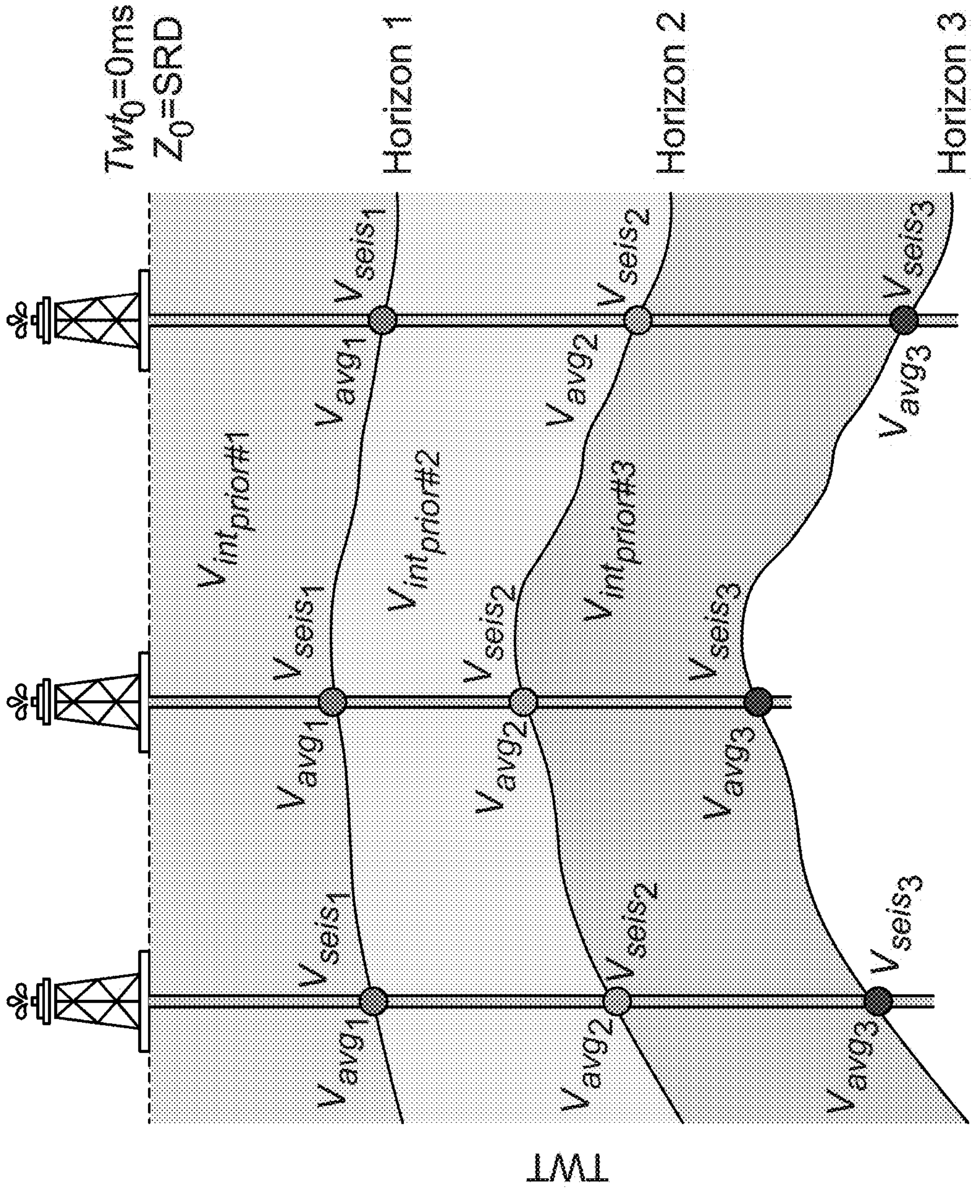
FIGS. 3A and 3B illustrate an example of determining a 2D prior interval velocity map using a correlation between actual well average velocity and derived seismic average velocity, according to some implementations.
Figure 3B:
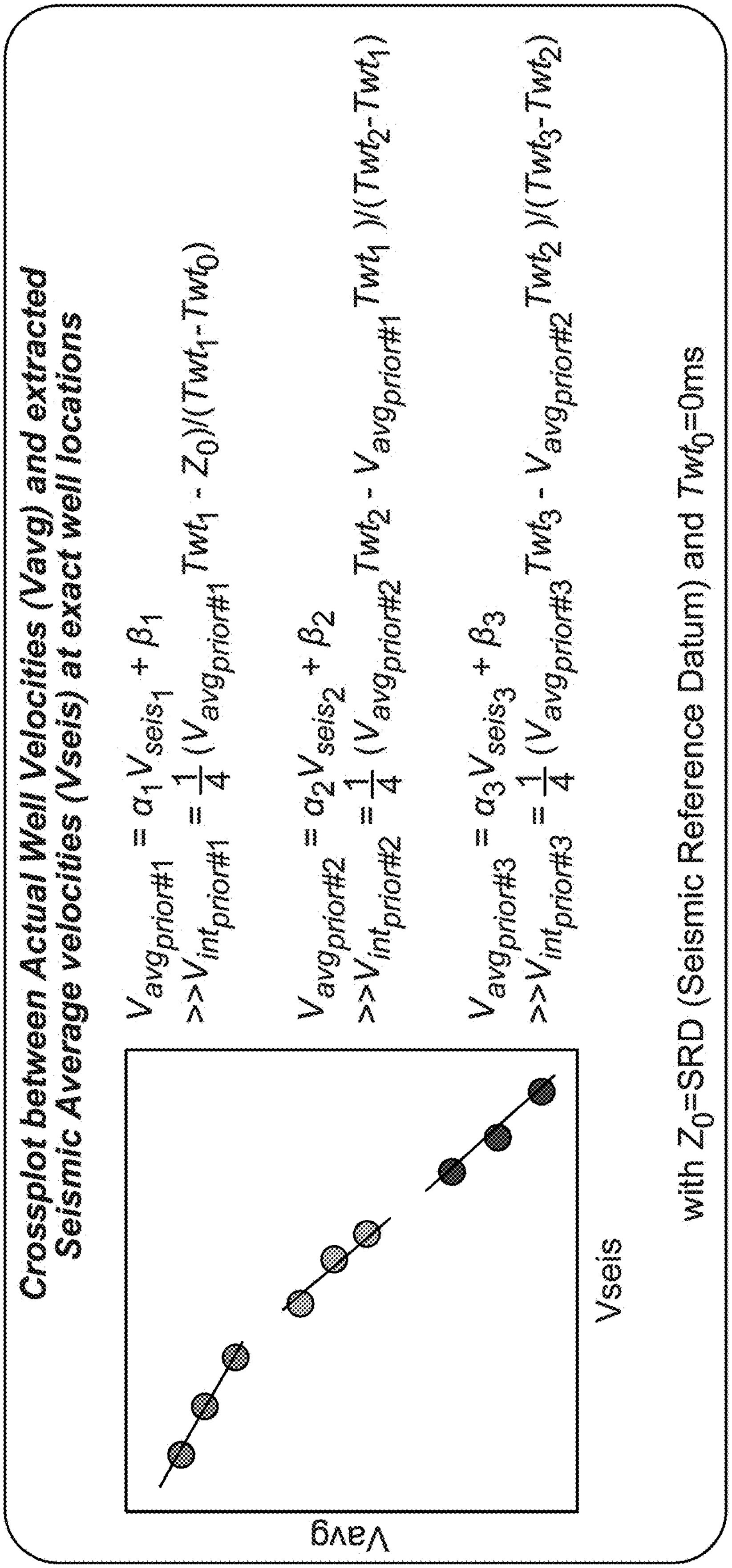

FIGS. 3A and 3B illustrate an example of determining a 2D prior interval velocity map using a correlation between actual well average velocity ($V_{avg}$) and derived seismic average velocity ($V_{seis}$). As shown in FIGS. 3A and 3B, a computer system can determine an average velocity prior map ($V_{avg_{priork}}$) for each of three picked horizons (interfaces), i.e., horizon 1, horizon 2, and horizon 3, as a function of seismic average velocity ($V_{seis_k}$) at three well locations, using Equation 3. Then the computer system can determine the prior interval velocity map ($V_{int_{priork}}$) between every two successive interfaces, i.e., between the surface and horizon 1, between horizon 1 and horizon 2, and between horizon 2 and horizon 3, using Equation 4 and picked horizon time ($Twt_k$) at the three well locations.

As stated previously, the computer system can additionally or alternatively generate a 3D prior interval velocity model in the two-way time (TWT) domain. The 3D prior interval velocity model can facilitate time-to-depth conversion for subsurface imaging. In some cases, the computer system can integrate interval velocities from sonic well logs, which can provide high-resolution and continuous measurements of the subsurface, with seismic reflection data that can offer broad spatial context.

In some implementations, the computer system can convert well log-derived interval velocities into average velocities as a function of TWT by using check-shot or vertical seismic profile (VSP) data. In some cases, the computer system can incorporate interpreted seismic horizons to spatially extend the velocity information, guided by seismic coherency, amplitude, or other attributes. Using interpolation and extrapolation between well locations, the computer system can create a 3D TWT velocity model that captures both the fine-scale detail from well log data and the broader spatial context provided by seismic horizons. In some cases, the computer system can use the seismic stacking velocities (Vrms) as an external drift for the interpolation/extrapolation process. Once the computer system builds the 3D model, the computer system can extract prior velocity maps (interval or average) and use the extracted prior velocity maps as a starting point for time-to-depth conversion and further refinement, and consequently determining the subsurface in the depth domain.

Figure 4:
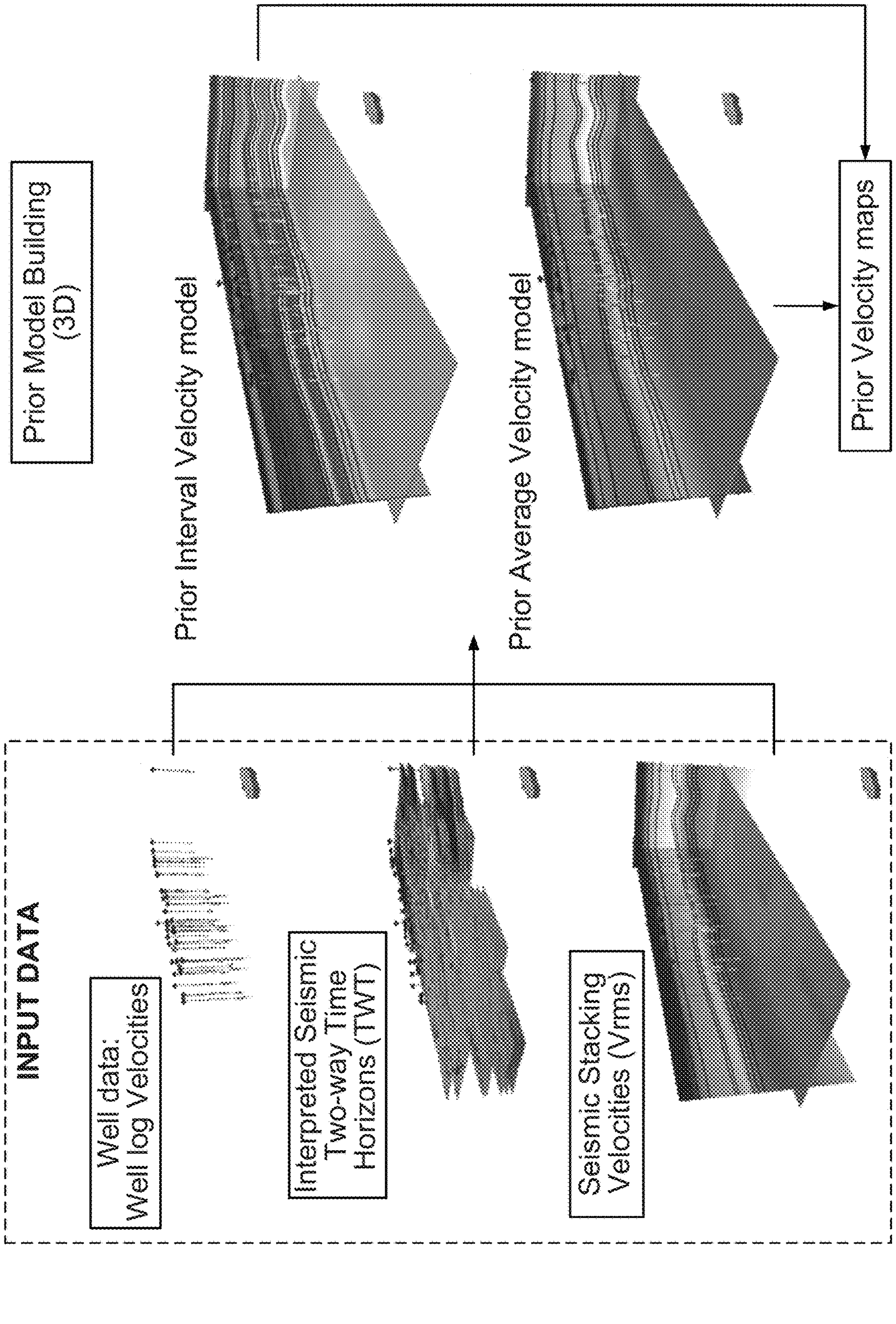
FIG. 4 illustrates an example process of determining 3D prior velocity maps using well log velocity, interpreted Seismic TWT horizons, and seismic stacking velocities, according to some implementations.

FIG. 4 illustrate an example process of determining 3D prior velocity maps using well log velocity, interpreted Seismic TWT horizons, and seismic stacking velocities. As shown in FIG. 4, a computer system can use well log velocity data, interpreted seismic TWT data, and seismic stacking velocity data Vrms as input data to generate 3D prior interval velocity model and 3D prior average velocity model, based on the steps described above. Then the computer system can use the two 3D models to extract prior velocity maps as a starting point for time-to-depth conversion and further refinement, and consequently determining the subsurface in the depth domain.

In some implementations, the computer system can select the method for determining prior velocity maps based on the prior residuals between the actual depth given by well geological marker locations and the estimated prior depth values as the same location. The computer system can select the prior velocity map (2D or 3D) giving the lowest residuals. Therefore, the computer system can designate accordingly the modeled stochastic variable, which can be either interval velocity or average velocity.

Returning to FIG. 1A, at 104, the computer system determines variogram estimates using the prior velocity maps determined at 102. In some implementations, since the prior velocity maps determined at 102 can be used later in process 100, the computer system can determine the spatial structure of the velocities in the prior velocity maps in order to quantify the degree of spatial continuity or autocorrelation. In some implementations, the computer system can determine the semi-variance between pairs of data points at multiple distances and plot the semi-variance against the lag distance. The resulting plot, i.e., variogram estimates, can be fitted with a theoretical model (e.g., exponential, Gaussian, or spherical) to characterize the spatial correlation structure of the velocity field represented by the prior velocity maps.

The spatial correlation structure can then be used at 106 for interpolation and prediction of velocities in unsampled locations using techniques such as kriging or Sequential Gaussian Simulation.

In some scenarios, the computer system can determine the variogram estimates by taking into account factors such as sampling rate of the velocity field, directional anisotropy, and trends or regionalized variables in the prior velocity maps. In other scenarios, the computer system can fit a theoretical variogram model (e.g., exponential, Gaussian, or spherical) to the variogram estimates and determine the major and minor direction ranges as well as the azimuth direction of the variogram estimates.

Figure 5:
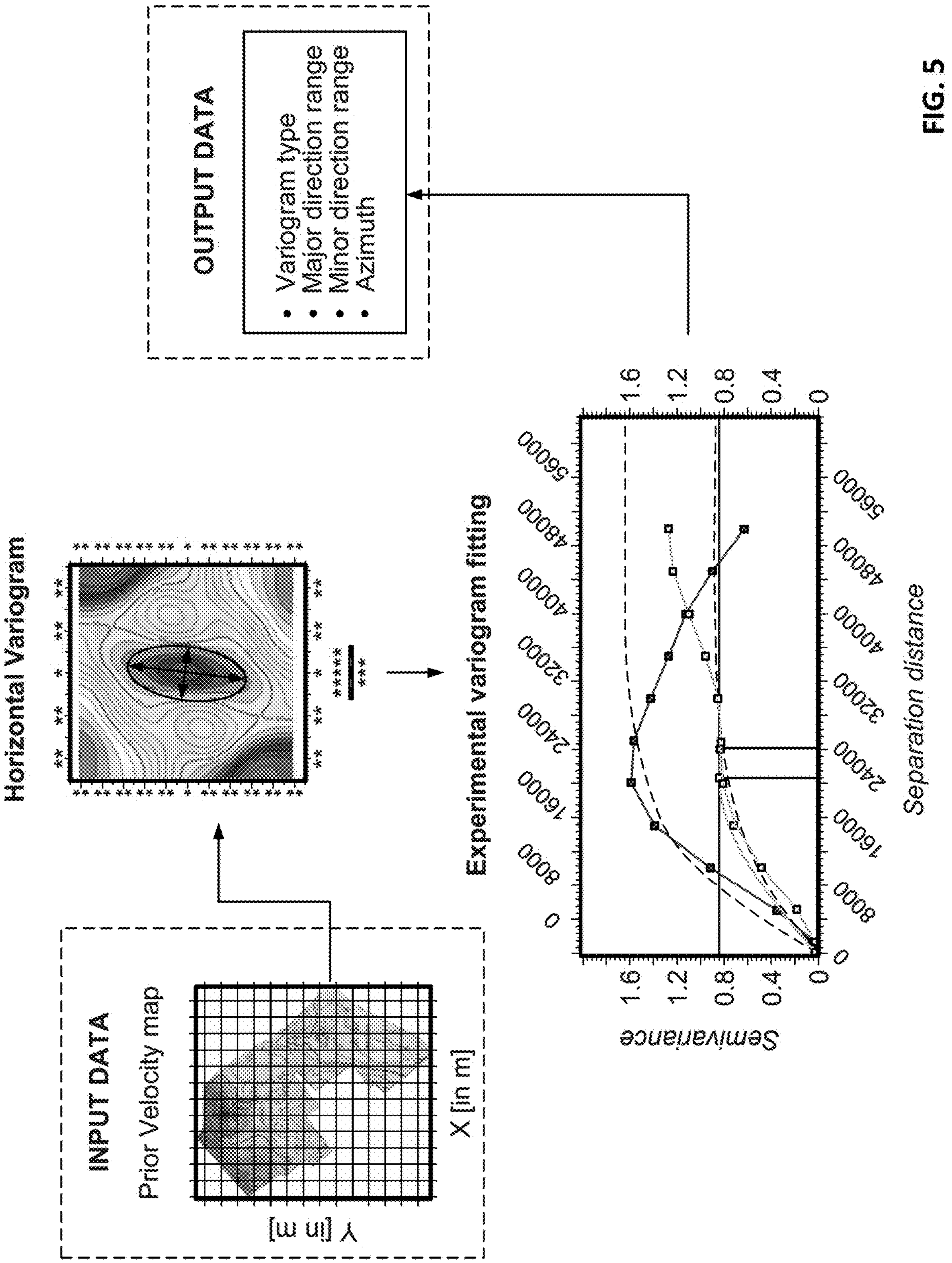
FIG. 5 illustrates an example process of determining variogram estimates and the major and minor direction ranges as well as the azimuth direction of the variogram estimates, according to some implementations.

FIG. 5 illustrates an example process of determining variogram estimates and the major and minor direction ranges as well as the azimuth direction of the variogram estimates. As shown in FIG. 5, a computer system can use the prior velocity maps determined at 102 to generate horizontal variogram. Then the computer system can use the generated horizontal variogram to generate semi-variance between pairs of data points at multiple distances and plot the semi-variance against the lag distance, which can then be fitted with a theoretical model (e.g., exponential, Gaussian, or spherical) to characterize the spatial correlation structure of the velocity field represented by the prior velocity maps, for example, as different variogram types. The computer system can also fit a theoretical variogram model (e.g., exponential, Gaussian, or spherical) to the semi-variance and determine the major and minor direction ranges as well as the azimuth direction of the variogram estimates.

Returning to FIG. 1A, at 106, the computer system determines velocities using a Sequential Gaussian Simulation (SGS) method. In some implementations, once the computer system determines the prior velocity maps at 102 and the respective spatial variograms of the prior velocity maps at 104, the computer system can simulate velocities using the Sequential Gaussian Simulation (SGS) technique with prior velocity maps as an external drift.

In some implementations, the computer system can incorporate the spatial variability and correlation structure of the prior velocity maps into the simulation process, such that the resulting well velocities are consistent with the observed spatial patterns. In some cases, the computer system visits each unsampled location in a random order and estimate the velocity at that location based on the available data points and the external drift (i.e., prior velocity maps), while accounting for the spatial correlation described by the variogram estimates. The computer system then perturbs the estimated velocity by a random residual drawn from a Gaussian distribution with zero mean and a variance equal to the local kriging estimation variance. The computer system can repeat this simulation process multiple times, generating a set of equally probable realizations of well velocities.

Figure 6:
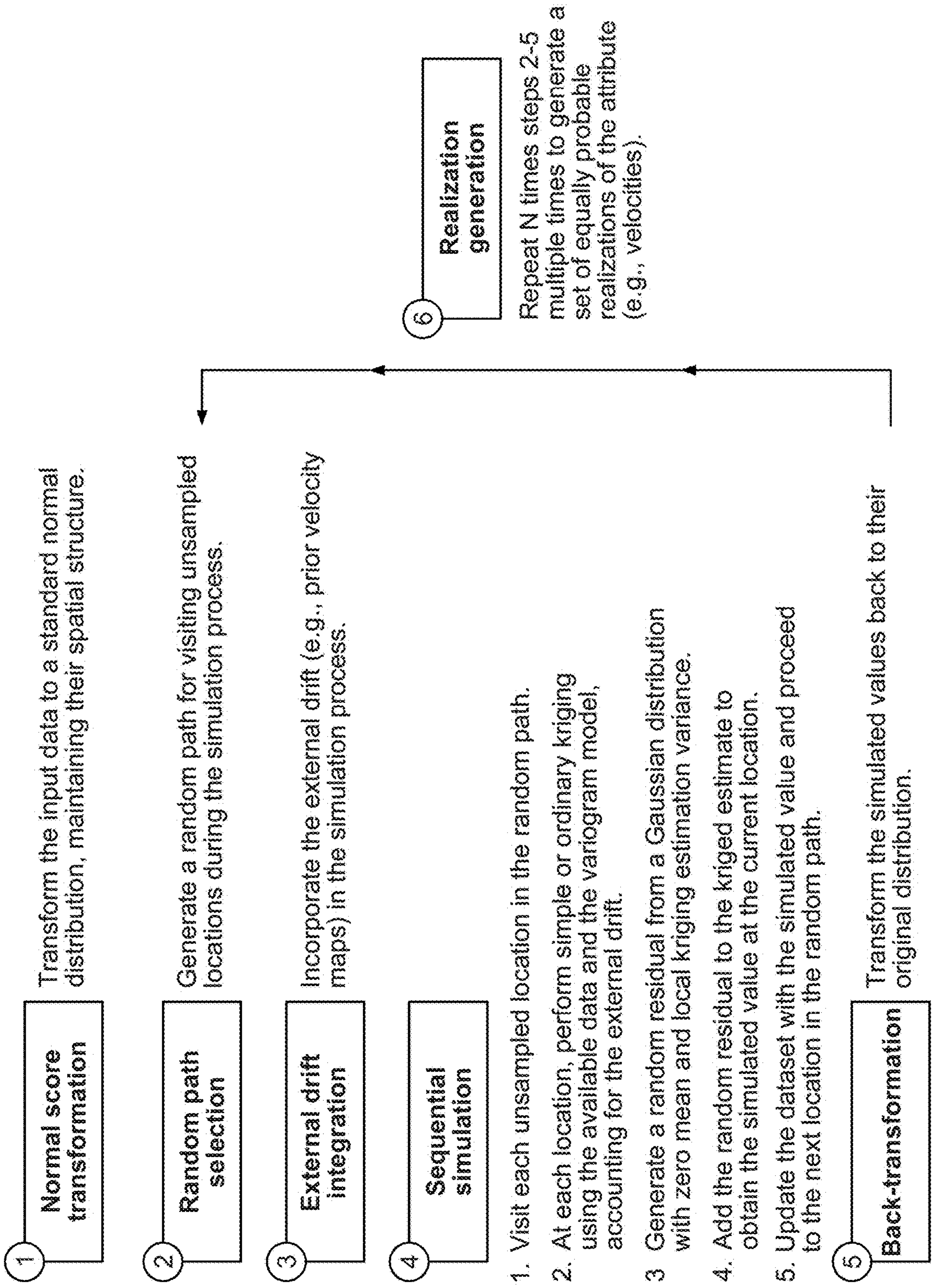
FIG. 6 illustrates an example process of determining velocities using a Sequential Gaussian Simulation (SGS) method, according to some implementations.

FIG. 6 illustrates an example process of determining velocities using a Sequential Gaussian Simulation (SGS) method. As shown in FIG. 6, the example process includes a series of steps.

In a first step, a computer system performs normal score transformation by transforming the input data to a standard normal distribution, maintaining their spatial structure.

In a second step, the computer system performs random path selection by generating a random path for visiting unsampled locations during the simulation process.

In a third step, the computer system performs external drift integration by incorporating the external drift (e.g., prior velocity maps) in the simulation process.

In a fourth step, the computer system performs sequential simulation that includes a series of steps, for example, (1) visiting each unsampled location in the random path; (2) performing, at each location, simple or ordinary kriging using the available data and the variogram model, accounting for the external drift; (3) generating a random residual from a Gaussian distribution with zero mean and local kriging estimation variance; (4) adding the random residual to the kriged estimate to obtain the simulated value at the current location; and (5) updating the dataset with the simulated value and proceeding to the next location in the random path.

In a fifth step, the computer system performs back-transformation by transforming the simulated values back to their original distribution.

In a sixth step, the computer system repeats steps 2-5 multiple times to generate a set of equally probable realizations of the attribute (e.g., velocities).

In some implementations, the computer system can use a trend modeling approach to integrate external drift into an SGS process. In some cases, the input prior velocity map represents the velocity trend, and the computer system can estimate coefficients (α,β) of an assumed linear relationship to fit the velocity trend to the input data at well locations $V_{int(X_{wells},Y_{wells})}$ using a least-square method, for example, using Equation 5 below:

$$V_{trend} = \alpha * V_{int(X_{wells},Y_{wells})} + \beta \tag{5}$$

In some examples, the computer system determines the residual between the input velocity data and the velocity trend at well locations, for example, using Equation 6 below:

$$\text{Residual} = V_{int(X_{wells},Y_{wells})} - V_{trend(X_{wells},Y_{wells})} \tag{6}$$

In some examples, the computer system can perform the SGS process on the residual by back-transforming the simulated results using Equation 7 below, with * denoting the back-transformed results:

$$V^*_{int} = \text{Residual}^* + V_{trend} \tag{7}$$

Returning to FIG. 1A, at 108, the computer system determines multiple depth map realizations and gross volumetric uncertainties associated with the hydrocarbon reservoir. In some implementations, if the simulated variable is interval velocity ($V_{int}$), the computer system can deduct an average velocity at each horizon ($V_{avg}$) for every single realization using Dix equation. If the simulated variable is average velocity, the computer system does not need to use Dix equation and can determine depth horizon maps for each realization through the time-to-depth relationship described in Equation 8 below, with k being the interface number and SRD being the surface reference datum:

$$Z_k = SRD + V_{avg_k} * (TWT_k/2) \tag{8}$$

In some implementations, the computer system can quantify the uncertainty of multiple stochastic depth horizon map realizations by evaluating the variability across the generated depth horizon map realizations to assess the spatial distribution of depth uncertainty. In some cases, the computer system can determine multiple statistical measures for each pixel or grid cell in the depth horizon maps. In some cases, the statistical measures can include the mean, variance, standard deviation and percentiles such as P10, P50 and P90 maps, which can be related to the central tendency and dispersion of the depth values across the realizations.

Figure 7:
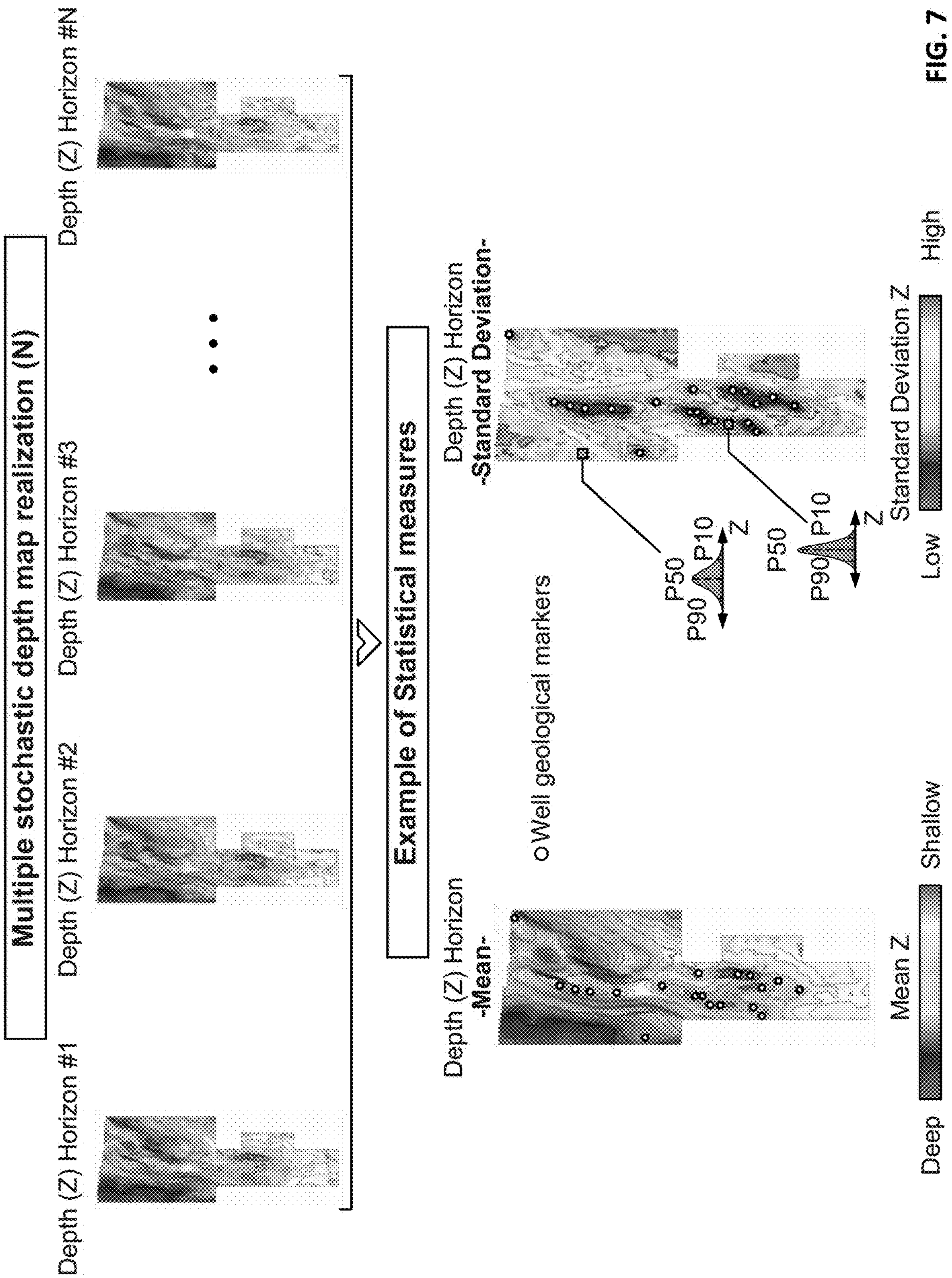
FIG. 7 illustrates example statistical measures for the grid cells in the depth horizon maps, according to some implementations.

FIG. 7 illustrates example statistical measures for the grid cells in the depth horizon maps. The standard deviation values are null at well locations since every single realization matches existing well data. As shown in FIG. 7, a computer system can determine multiple depth map realizations, for example, realization #1 through #N, using a time-to-depth relationship, for example, Equation 8 above. Then the computer system can determine multiple statistical measures for each pixel or grid cell in the depth horizon maps, for example, the mean, standard deviation, and percentiles such as P50 shown in FIG. 7.

Figure 8:
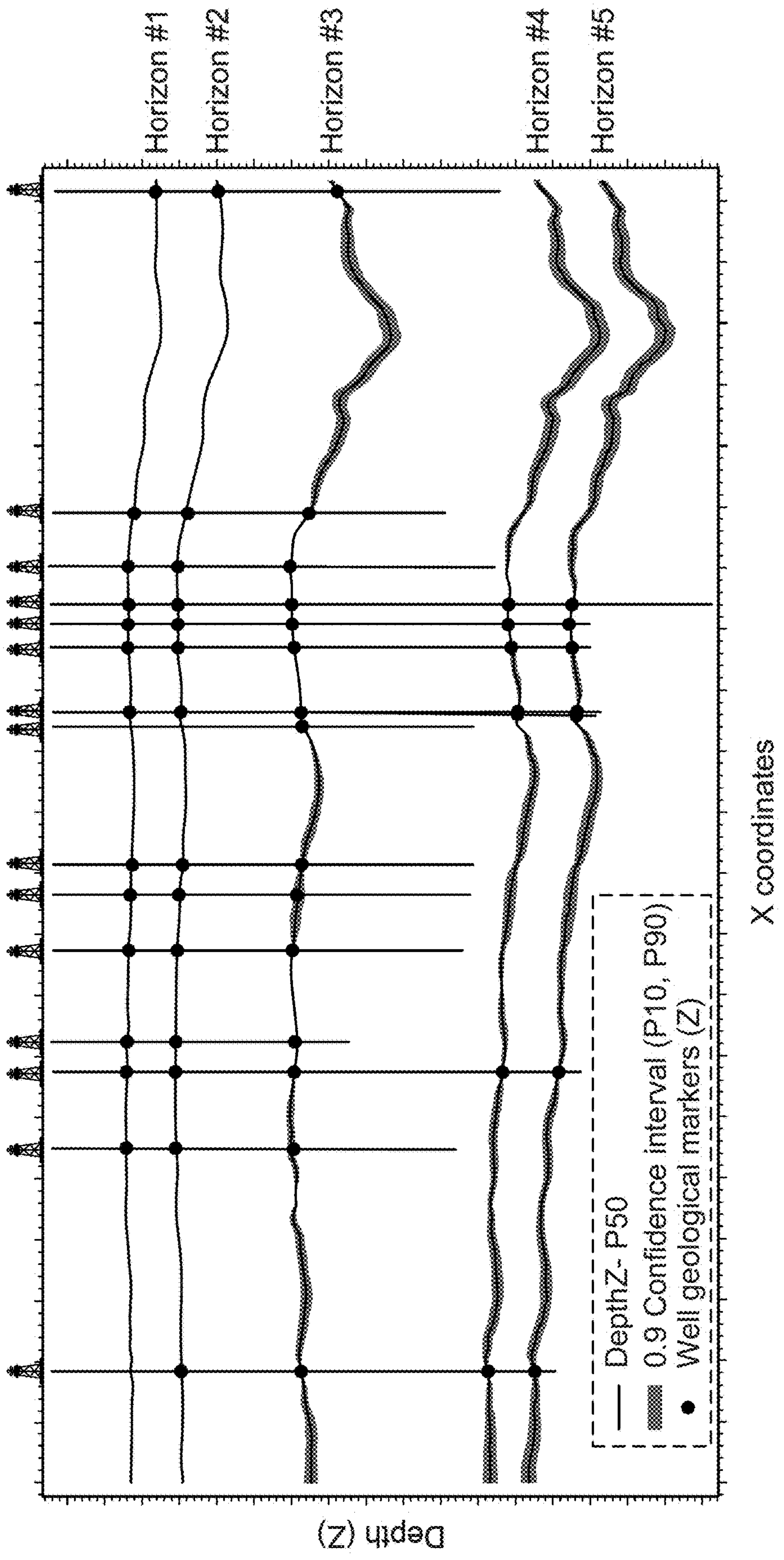
FIG. 8 illustrates an example vertical cross section showing the P50 depth horizons as well as the associated 0.9 confidence intervals, according to some implementations.

FIG. 8 illustrates an example vertical cross section showing the P50 depth horizons as well as the associated 0.9 confidence intervals. As shown in FIG. 8, the uncertainty can increase in-between wells while the uncertainty is null at well geological marker positions. Additionally, the estimated depth uncertainties can increase with depth.

In some implementations, the computer system can combine a given fluid contact with all depth map realizations to quantify the uncertainty in gross rock volume (GRV) estimates. By incorporating a fixed fluid contact, such as the oil-water contact (OWC) or gas-oil contact (GOC), into each depth map realization, the computer system can delineate the hydrocarbon-bearing portion of the reservoir for each realization.

In some implementations, the computer system can quantify the GRV uncertainty in a series of steps. In a first step of incorporating fluid contact, the computer system can apply a fixed fluid contact to each depth map realization to identify the hydrocarbon-bearing zone (the portion of the reservoir above the fixed fluid contact).

In a second step of GRV calculation for each realization, the computer system can determine the gross rock volume for the hydrocarbon-bearing zone in each depth map realization, by summing the product of the grid cell dimensions (area and thickness) above the fixed fluid contact.

In a third step of GRV uncertainty evaluation, the computer system can analyze the GRV values across all realizations to assess the uncertainty. The computer system can determine statistics, for example, the mean, median, standard deviation, and coefficient of variation, that can be used to characterize the central tendency, dispersion, and relative uncertainty in GRV estimates.

In a fourth step of probability distributions generation, the computer system can determine the probability distribution functions (PDFs) or cumulative distribution functions (CDFs) to represent the full range of GRV uncertainty and assess the likelihood of different GRV outcomes.

Figure 9:
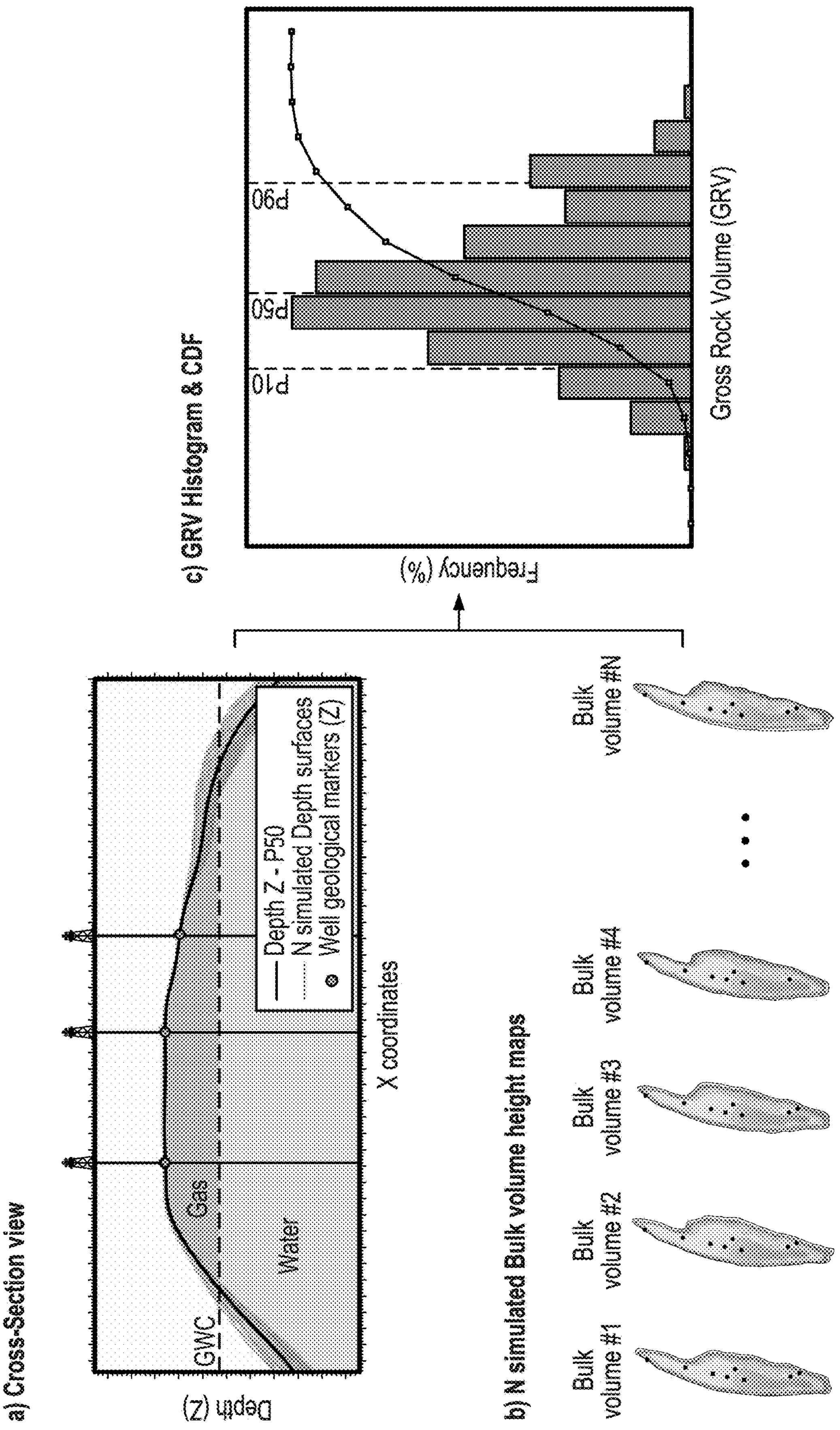
FIG. 9 illustrates an example process of evaluating GRV uncertainty, according to some implementations.

FIG. 9 illustrates an example process of evaluating GRV uncertainty. Cross-section view in FIG. 9 shows a fixed fluid contact and multiple top depth reservoir simulation. Map view in FIG. 9 shows the corresponding N simulated bulk volume height maps. GRV probability distribution in FIG. 9 shows the full range of GRV uncertainties in terms of GRV histogram (representing PDF) and CDF.

In some implementations, the computer system can use structural uncertainties to estimate the likelihood of the top of a reservoir being above a given fluid contact at each grid cell position. The computer system can create a probability map of being above a given fluid contact using a series of steps.

In a first step, the computer system can generate multiple realizations of the top reservoir grid, each representing a possible interpretation of the seismic data and capturing the structural uncertainty.

In a second step, for each realization, the computer system can determine if the top of the reservoir is above the given fluid contact.

In a third step, the computer system can calculate the probability at each grid cell by dividing the number of realizations where the top of the reservoir is above the fluid contact by the total number of realizations.

In a fourth step, the computer system can create a probability map by interpolating the probability values at each grid cell in the depth horizon map.

In some implementations, the computer system can provide the probability map for assessing the risk or opportunity associated with reservoir development, and for determining field appraisal, well placement, or production strategies.

Figure 10:
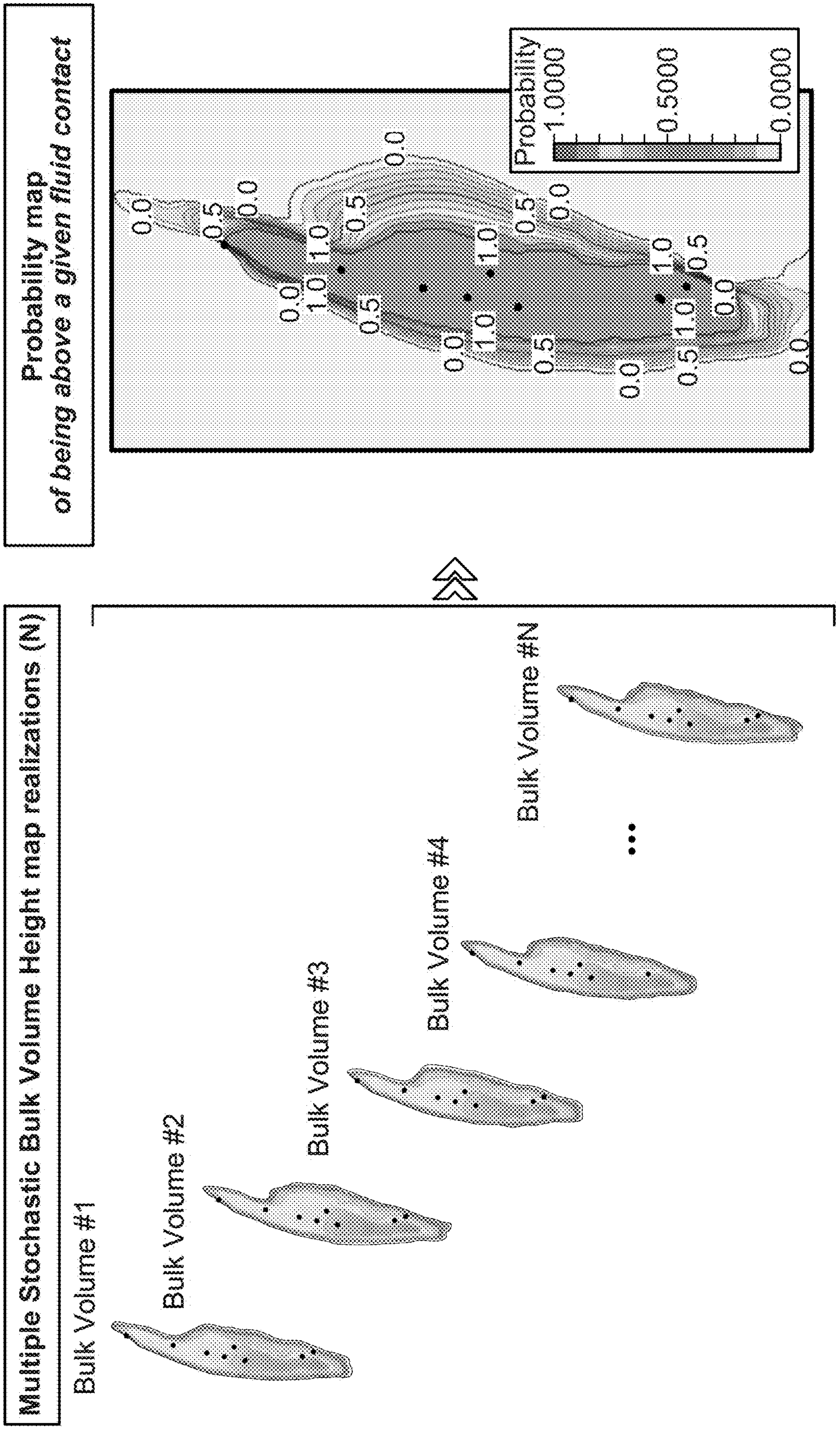
FIG. 10 illustrates an example of using a probability map of a portion of a reservoir being above a given fluid contact to assess the risk or opportunity associated with gross rock volume.

FIG. 10 illustrates an example of using a probability map of a portion of a reservoir being above a given fluid contact to assess the risk or opportunity associated with gross rock volume. As shown in FIG. 10, a computer system can generate multiple stochastic bulk volume height map realizations, for example, realizations #1 to #N. Then the computer system can use the N realizations to generate a probability map of being above a given fluid contact, based on the last three steps (the second step to the fourth step) described above.

Figure 11:
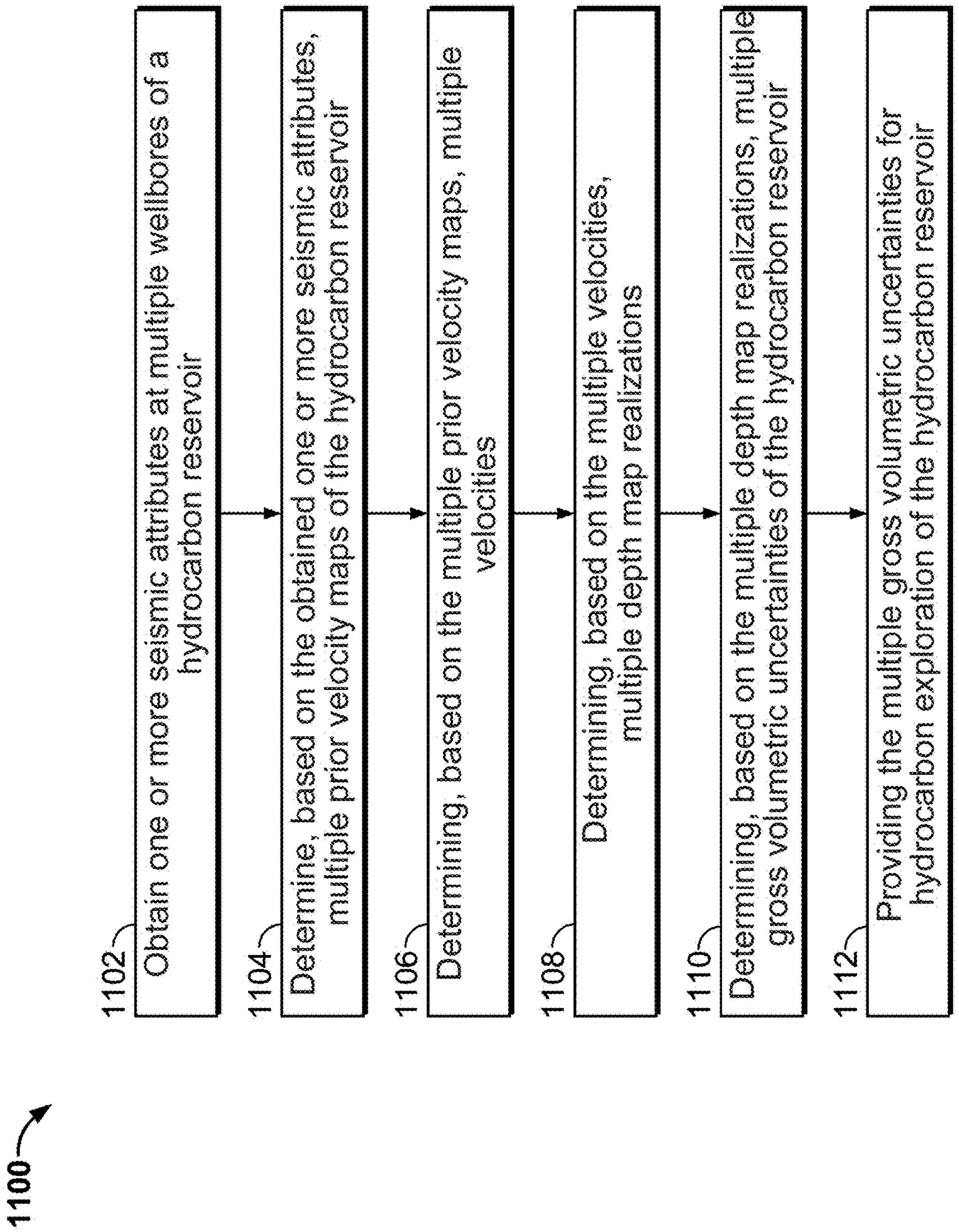
FIG. 11 illustrates an example process for geostatistical depth map based hydrocarbon exploration, according to some implementations.

FIG. 11 illustrates an example process 1100 for geostatistical depth map based hydrocarbon exploration. For convenience, process 1100 will be described as being performed by a computer system having one or more computers located in one or more locations and programmed appropriately in accordance with this specification. An example of the computer system is the computing system 1200 illustrated in FIG. 12 and described below.

At 1102, a computer system obtains one or more seismic attributes at multiple wellbores of a hydrocarbon reservoir.

At 1104, the computer system determines, based on the obtained one or more seismic attributes, multiple prior velocity maps of the hydrocarbon reservoir.

At 1106, the computer system determines, based on the multiple prior velocity maps, multiple velocities.

At 1108, the computer system determines, based on the multiple velocities, multiple depth map realizations.

At 1110, the computer system determines, based on the multiple depth map realizations, multiple gross volumetric uncertainties of the hydrocarbon reservoir.

At 1112, the computer system provides the multiple gross volumetric uncertainties for hydrocarbon exploration of the hydrocarbon reservoir.

Figure 12:
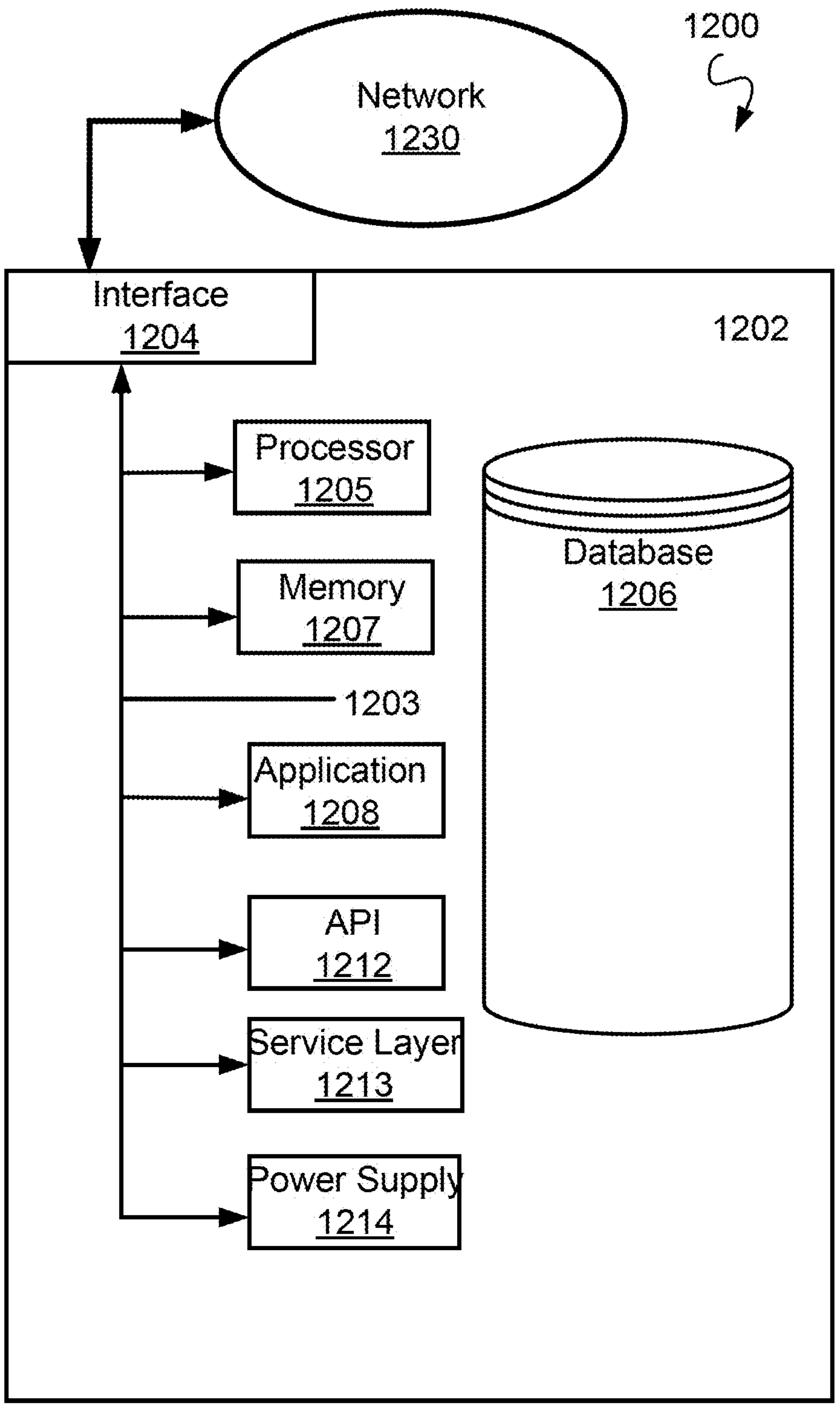
FIG. 12 is a block diagram of an example computer system that can be used to provide computational functionalities associated with described algorithms, methods, functions, processes, flows, and procedures, according to some implementations of the present disclosure.

FIG. 12 is a block diagram of an example computer system 1200 that can be used to provide computational functionalities associated with described algorithms, methods, functions, processes, flows, and procedures, according to some implementations of the present disclosure. In some implementations, the computer system performing process 100 or 1100 can be the computer system 1200, include the computer system 1200, or the computer system performing process 100 or 1100 can communicate with the computer system 1200.

The illustrated computer 1202 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 1202 can include a Smart Embedded Management Agent (SEMA), such as a built-in ADLINK SEMA 2.2, and a video sync technology, such as Quick Sync Video technology supported by ADLINK MSDK+. In some examples, the computer 1202 can include the MXE-5400 Series processor-based fanless embedded computer by ADLINK, though the computer 1202 can take other forms or include other components.

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a high level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both), over the system bus. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs 1212.

The service layer 1213 can provide software services to the computer 1202 and other components (whether illustrated or not) that are communicably coupled to the computer 1202. The functionality of the computer 1202 can be accessible for all service consumers using this service layer 1213. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or sub-modules of another software module, enterprise application, or hardware module without departing from the scope of the present disclosure.

The computer 1202 can include an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and manipulate data to perform the operations of the computer 1202, including operations using algorithms, methods, functions, processes, flows, and procedures as described in the present disclosure.

The computer 1202 can also include a database 1206 that can hold data for the computer 1202 and other components connected to the network 1230 (whether illustrated or not). For example, database 1206 can be an in-memory, conventional, or a database storing data consistent with the present disclosure. In some implementations, the database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

An application 1208 can be an algorithmic software engine providing functionality according to particular needs, desires, or particular implementations of the computer 1202 and the described functionality. For example, an application 1208 can serve as one or more components, modules, or applications 1208. Multiple applications 1208 can be implemented on the computer 1202. Each application 1208 can be internal or external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power-supply 1214 can include a power plug to allow the computer 1202 to be plugged into a wall socket or a power source to, for example, power the computer 1202 or recharge a rechargeable battery.

There can be any number of computers 1202 associated with, or external to, a computer system including computer 1202, with each computer 1202 communicating over network 1230. Further, the terms "client", "user", and other appropriate terminology can be used interchangeably without departing from the scope of the present disclosure. Moreover, the present disclosure contemplates that many users can use one computer 1202 and one user can use multiple computers 1202.

Figure 13:
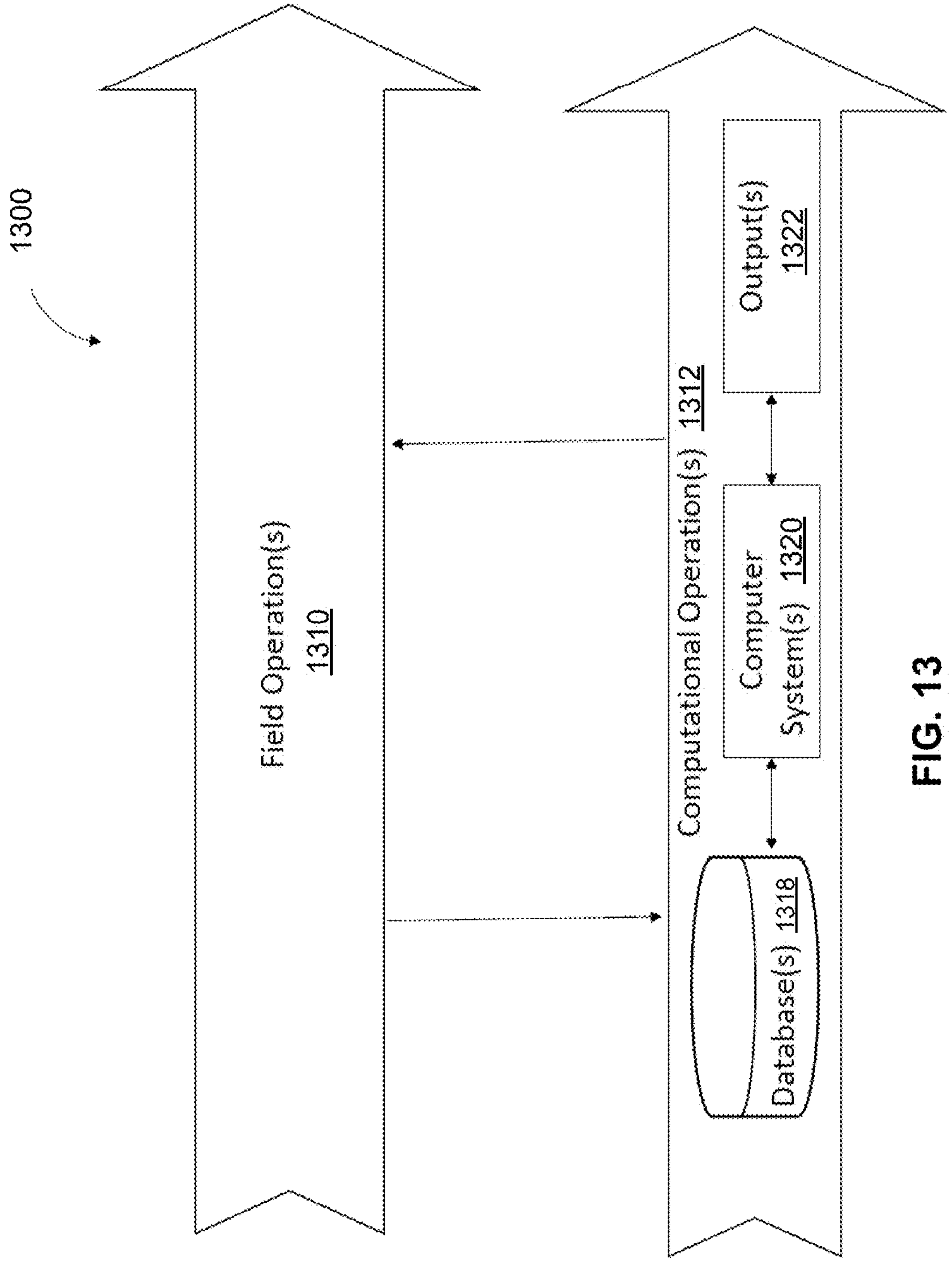
FIG. 13 illustrates hydrocarbon production operations that include both one or more field operations and one or more computational operations, which exchange information and control exploration for the production of hydrocarbons, according to some implementations.

FIG. 13 illustrates hydrocarbon production operations 1300 that include both one or more field operations 1310 and one or more computational operations 1312, which exchange information and control exploration for the production of hydrocarbons. In some implementations, outputs of techniques of the present disclosure can be performed before, during, or in combination with the hydrocarbon production operations 1300, specifically, for example, either as field operations 1310 or computational operations 1312, or both.

Examples of field operations 1310 include forming/drilling a wellbore, hydraulic fracturing, producing through the wellbore, injecting fluids (such as water) through the wellbore, to name a few. In some implementations, methods of the present disclosure can trigger or control the field operations 1310. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 1310 and responsively triggering the field operations 1310 including, for example, generating plans and signals that provide feedback to and control physical components of the field operations 1310. Alternatively or in addition, the field operations 1310 can trigger the methods of the present disclosure. For example, implementing physical components (including, for example, hardware, such as sensors) deployed in the field operations 1310 can generate plans and signals that can be provided as input or feedback (or both) to the methods of the present disclosure.

Examples of computational operations 1312 include one or more computer systems 1320 that include one or more processors and computer-readable media (e.g., non-transitory computer-readable media) operatively coupled to the one or more processors to execute computer operations to perform the methods of the present disclosure. The computational operations 1312 can be implemented using one or more databases 1318, which store data received from the field operations 1310 and/or generated internally within the computational operations 1312 (e.g., by implementing the methods of the present disclosure) or both. For example, the one or more computer systems 1320 process inputs from the field operations 1310 to assess conditions in the physical world, the outputs of which are stored in the databases 1318. For example, seismic sensors of the field operations 1310 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 1312 where they are stored in the databases 1318 and analyzed by the one or more computer systems 1320.

In some implementations, one or more outputs 1322 generated by the one or more computer systems 1320 can be provided as feedback/input to the field operations 1310 (either as direct input or stored in the databases 1318). The field operations 1310 can use the feedback/input to control physical components used to perform the field operations 1310 in the real world.

For example, the computational operations 1312 can process the seismic data to generate three-dimensional (3D) maps of the subsurface formation. The computational operations 1312 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 1312 to process new information about the formation and control the drilling to adjust to the observed conditions in real-time.

The one or more computer systems 1320 can update the 3D maps of the subsurface formation as information from one exploration well is received and the computational operations 1312 can adjust the location of the next exploration well based on the updated 3D maps. Similarly, the data received from production operations can be used by the computational operations 1312 to control components of the production operations. For example, production well and pipeline data can be analyzed to predict slugging in pipelines leading to a refinery and the computational operations 1312 can control machine operated valves upstream of the refinery to reduce the likelihood of plant disruptions that run the risk of taking the plant offline.

In some implementations of the computational operations 1312, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus", "computer", and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus and special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser. Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

EMBODIMENTS

Embodiment 1: A computer-implemented method comprising obtaining one or more seismic attributes at a plurality of wellbores of a hydrocarbon reservoir; determining, based on the obtained one or more seismic attributes, a plurality of prior velocity maps of the hydrocarbon reservoir; determining, based on the plurality of prior velocity maps, a plurality of velocities; determining, based on the plurality of velocities, a plurality of depth map realizations; determining, based on the plurality of depth map realizations, a plurality of gross volumetric uncertainties of the hydrocarbon reservoir; and providing the plurality of gross volumetric uncertainties for hydrocarbon exploration of the hydrocarbon reservoir.

Embodiment 2: The computer-implemented method of embodiment 1, wherein the hydrocarbon exploration of the hydrocarbon reservoir comprises at least one of reservoir development, field appraisal, or well placement in the hydrocarbon reservoir.

Embodiment 3: The computer-implemented method of embodiment 1 or 2, wherein the plurality of gross volumetric uncertainties of the hydrocarbon reservoir comprises at least one of uncertainties in gross rock volume estimates of the hydrocarbon reservoir or a likelihood of a top of the hydrocarbon reservoir being above a given fluid contact at each grid cell position in the plurality of depth map realizations.

Embodiment 4: The computer-implemented method of any one of embodiments 1 to 3, wherein determining the plurality of velocities comprises determining, based on the plurality of prior velocity maps, a plurality of variogram estimates; and determining, based on the plurality of variogram estimates, the plurality of velocities.

Embodiment 5: The computer-implemented method of any one of embodiments 1 to 4, wherein the one or more seismic attributes comprise a plurality of seismic stacking velocities of the hydrocarbon reservoir, and determining the plurality of prior velocity maps of the hydrocarbon reservoir comprises determining, based on the plurality of seismic stacking velocities, the plurality of prior velocity maps.

Embodiment 6: The computer-implemented method of any one of embodiments 1 to 5, wherein the method further comprises obtaining a plurality of interpreted seismic two-way time horizons of the hydrocarbon reservoir; and determining the plurality of prior velocity maps comprises determining, based on the plurality of interpreted seismic two-way time horizons and the obtained one or more seismic attributes, the plurality of prior velocity maps.

Embodiment 7: The computer-implemented method of any one of embodiments 1 to 5, wherein the method further comprises obtaining a plurality of depth geological markers at the plurality of wellbores of the hydrocarbon reservoir; and determining the plurality of prior velocity maps comprises determining, based on the plurality of depth geological markers and the obtained one or more seismic attributes, the plurality of prior velocity maps.

Embodiment 8: The computer-implemented method of embodiment 7, wherein obtaining the plurality of depth geological markers comprises obtaining the plurality of depth geological markers based on check-shots at the plurality of wellbores of the hydrocarbon reservoir.

Embodiment 9: The computer-implemented method of any one of embodiments 1 to 8, wherein determining the plurality of velocities comprises determining the plurality of velocities based on a Sequential Gaussian Simulation (SGS) method.

Embodiment 10: The computer-implemented method of any one of embodiments 1 to 9, wherein the prior velocity maps comprises one of prior interval velocity maps or prior average velocity maps.

Embodiment 11: A non-transitory computer-readable medium storing one or more instructions executable by a computer system to perform operations comprising obtaining one or more seismic attributes at a plurality of wellbores of a hydrocarbon reservoir; determining, based on the obtained one or more seismic attributes, a plurality of prior velocity maps of the hydrocarbon reservoir; determining, based on the plurality of prior velocity maps, a plurality of velocities; determining, based on the plurality of velocities, a plurality of depth map realizations; determining, based on the plurality of depth map realizations, a plurality of gross volumetric uncertainties of the hydrocarbon reservoir; and providing the plurality of gross volumetric uncertainties for hydrocarbon exploration of the hydrocarbon reservoir.

Embodiment 12: The non-transitory computer-readable medium of embodiment 11, wherein the hydrocarbon exploration of the hydrocarbon reservoir comprises at least one of reservoir development, field appraisal, or well placement in the hydrocarbon reservoir.

Embodiment 13: The non-transitory computer-readable medium of embodiment 11 or 12, wherein the plurality of gross volumetric uncertainties of the hydrocarbon reservoir comprises at least one of uncertainties in gross rock volume estimates of the hydrocarbon reservoir or a likelihood of a top of the hydrocarbon reservoir being above a given fluid contact at each grid cell position in the plurality of depth map realizations.

Embodiment 14: The non-transitory computer-readable medium of any one of embodiments 11 to 13, wherein the operations further comprise obtaining a plurality of depth geological markers at the plurality of wellbores of the hydrocarbon reservoir; and determining the plurality of prior velocity maps comprises determining, based on the plurality of depth geological markers and the obtained one or more seismic attributes, the plurality of prior velocity maps.

Embodiment 15: The non-transitory computer-readable medium of any one of embodiments 11 to 14, wherein determining the plurality of velocities comprises determining the plurality of velocities based on a Sequential Gaussian Simulation (SGS) method.

Embodiment 16: A computer-implemented system, comprising one or more computers; and one or more computer memory devices interoperably coupled with the one or more computers and having tangible, non-transitory, machine-readable media storing one or more instructions that, when executed by the one or more computers, perform one or more operations comprising obtaining one or more seismic attributes at a plurality of wellbores of a hydrocarbon reservoir; determining, based on the obtained one or more seismic attributes, a plurality of prior velocity maps of the hydrocarbon reservoir; determining, based on the plurality of prior velocity maps, a plurality of velocities; determining, based on the plurality of velocities, a plurality of depth map realizations; determining, based on the plurality of depth map realizations, a plurality of gross volumetric uncertainties of the hydrocarbon reservoir; and providing the plurality of gross volumetric uncertainties for hydrocarbon exploration of the hydrocarbon reservoir.

Embodiment 17: The computer-implemented system of embodiment 16, wherein the hydrocarbon exploration of the hydrocarbon reservoir comprises at least one of reservoir development, field appraisal, or well placement in the hydrocarbon reservoir.

Embodiment 18: The computer-implemented system of embodiment 16 or 17, wherein the plurality of gross volumetric uncertainties of the hydrocarbon reservoir comprises at least one of uncertainties in gross rock volume estimates of the hydrocarbon reservoir or a likelihood of a top of the hydrocarbon reservoir being above a given fluid contact at each grid cell position in the plurality of depth map realizations.

Embodiment 19: The computer-implemented system of any one of embodiments 16 to 18, wherein the one or more operations further comprise obtaining a plurality of depth geological markers at the plurality of wellbores of the hydrocarbon reservoir; and determining the plurality of prior velocity maps comprises determining, based on the plurality of depth geological markers and the obtained one or more seismic attributes, the plurality of prior velocity maps.

Embodiment 20: The computer-implemented system of any one of embodiments 16 to 19, wherein determining the plurality of velocities comprises determining the plurality of velocities based on a Sequential Gaussian Simulation (SGS) method.

We claim:

1. A computer-implemented method comprising:

obtaining one or more seismic attributes at a plurality of wellbores of a hydrocarbon reservoir;

determining, based on the obtained one or more seismic attributes, a plurality of prior velocity maps of the hydrocarbon reservoir;

determining, based on the plurality of prior velocity maps, a plurality of velocities accounting for a velocity trend defining an external drift;

determining, based on the plurality of velocities, a plurality of depth map realizations;

determining, based on the plurality of depth map realizations, a plurality of gross volumetric uncertainties of the hydrocarbon reservoir combining a fixed fluid contact with the plurality of depth map realizations to quantify uncertainty in gross rock volume estimates; and controlling, based on the plurality of gross volumetric uncertainties drilling equipment for well placement in the hydrocarbon reservoir.

2. The computer-implemented method of claim 1, wherein controlling the drilling equipment for well placement in the hydrocarbon reservoir comprises controlling a drill bit speed and a drill bit direction.

3. The computer-implemented method of claim 1, wherein the plurality of gross volumetric uncertainties of the hydrocarbon reservoir comprises at least one of uncertainties in gross rock volume estimates of the hydrocarbon reservoir or a likelihood of a top of the hydrocarbon reservoir being above a given fluid contact at each grid cell position in the plurality of depth map realizations.

4. The computer-implemented method of claim 1, wherein determining the plurality of velocities comprises:

determining, based on the plurality of prior velocity maps, a plurality of variogram estimates; and determining, based on the plurality of variogram estimates, the plurality of velocities.

5. The computer-implemented method of claim 1, wherein the one or more seismic attributes comprise a plurality of seismic stacking velocities of the hydrocarbon reservoir, and determining the plurality of prior velocity maps of the hydrocarbon reservoir comprises determining, based on the plurality of seismic stacking velocities, the plurality of prior velocity maps.

6. The computer-implemented method of claim 1, wherein the method further comprises:

obtaining a plurality of interpreted seismic two-way time horizons of the hydrocarbon reservoir; and determining the plurality of prior velocity maps comprises determining, based on the plurality of interpreted seismic two-way time horizons and the obtained one or more seismic attributes, the plurality of prior velocity maps.

7. The computer-implemented method of claim 1, wherein the method further comprises:

obtaining a plurality of depth geological markers at the plurality of wellbores of the hydrocarbon reservoir; and determining the plurality of prior velocity maps comprises determining, based on the plurality of depth geological markers and the obtained one or more seismic attributes, the plurality of prior velocity maps.

8. The computer-implemented method of claim 7, wherein obtaining the plurality of depth geological markers comprises obtaining the plurality of depth geological markers based on check-shots at the plurality of wellbores of the hydrocarbon reservoir.

9. The computer-implemented method of claim 1, wherein determining the plurality of velocities comprises determining the plurality of velocities based on a Sequential Gaussian Simulation (SGS) method.

10. The computer-implemented method of claim 1, wherein the prior velocity maps comprises one of prior interval velocity maps or prior average velocity maps.

11. A non-transitory computer-readable medium storing one or more instructions executable by a computer system to perform operations comprising:

obtaining one or more seismic attributes at a plurality of wellbores of a hydrocarbon reservoir;

determining, based on the obtained one or more seismic attributes, a plurality of prior velocity maps of the hydrocarbon reservoir;

determining, based on the plurality of prior velocity maps, a plurality of velocities accounting for a velocity trend defining an external drift;

determining, based on the plurality of velocities, a plurality of depth map realizations;

determining, based on the plurality of depth map realizations, a plurality of gross volumetric uncertainties of the hydrocarbon reservoir combining a fixed fluid contact with the plurality of depth map realizations to quantify uncertainty in gross rock volume estimates; and controlling, based on the plurality of gross volumetric uncertainties drilling equipment for well placement in the hydrocarbon reservoir.

12. The non-transitory computer-readable medium of claim 11, wherein controlling the drilling equipment well placement in the hydrocarbon reservoir comprises controlling a drill bit speed and a drill bit direction.

13. The non-transitory computer-readable medium of claim 11, wherein the plurality of gross volumetric uncertainties of the hydrocarbon reservoir comprises at least one of uncertainties in gross rock volume estimates of the hydrocarbon reservoir or a likelihood of a top of the hydrocarbon reservoir being above a given fluid contact at each grid cell position in the plurality of depth map realizations.

14. The non-transitory computer-readable medium of claim 11, wherein the operations further comprise:

obtaining a plurality of depth geological markers at the plurality of wellbores of the hydrocarbon reservoir; and determining the plurality of prior velocity maps comprises determining, based on the plurality of depth geological markers and the obtained one or more seismic attributes, the plurality of prior velocity maps.

15. The non-transitory computer-readable medium of claim 11, wherein determining the plurality of velocities comprises determining the plurality of velocities based on a Sequential Gaussian Simulation (SGS) method.

16. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining one or more seismic attributes at a plurality of wellbores of a hydrocarbon reservoir;

determining, based on the obtained one or more seismic attributes, a plurality of prior velocity maps of the hydrocarbon reservoir;

determining, based on the plurality of prior velocity maps, a plurality of velocities accounting for a velocity trend defining an external drift;

determining, based on the plurality of velocities, a plurality of depth map realizations;

determining, based on the plurality of depth map realizations, a plurality of gross volumetric uncertainties of the hydrocarbon reservoir combining a fixed fluid contact with the plurality of depth map realizations to quantify uncertainty in gross rock volume estimates; and controlling, based on the plurality of gross volumetric uncertainties drilling equipment for well placement in the hydrocarbon reservoir.

17. The computer-implemented system of claim 16, wherein controlling the drilling equipment for well placement in the hydrocarbon reservoir comprises controlling a drill bit speed and a drill bit direction.

18. The computer-implemented system of claim 16, wherein the plurality of gross volumetric uncertainties of the hydrocarbon reservoir comprises at least one of uncertainties in gross rock volume estimates of the hydrocarbon reservoir or a likelihood of a top of the hydrocarbon reservoir being above a given fluid contact at each grid cell position in the plurality of depth map realizations.

19. The computer-implemented system of claim 16, wherein the one or more operations further comprise:

obtaining a plurality of depth geological markers at the plurality of wellbores of the hydrocarbon reservoir; and determining the plurality of prior velocity maps comprises determining, based on the plurality of depth geological markers and the obtained one or more seismic attributes, the plurality of prior velocity maps.

20. The computer-implemented system of claim 16, wherein determining the plurality of velocities comprises determining the plurality of velocities based on a Sequential Gaussian Simulation (SGS) method.

* * * * *